US005165294A

United States Patent [19]

Utsumi

[11] Patent Number: 5,165,294

[45] Date of Patent: Nov. 24, 1992

[54] ENGINE, TRANSMISSION ASSEMBLY FOR VEHICLE

[75] Inventor: Yoji Utsumi, Iwata, Japan

[73] Assignee: Yamaha Hatsudoki Kabushiki Kaisha, Iwata, Japan

[21] Appl. No.: 532,191

[22] Filed: Jul. 9, 1990

[30] Foreign Application Priority Data

Jun. 12, 1989 [JP] Japan ................................ 1-149120

[51] Int. Cl.[5] ...................... F16H 57/02; F02B 75/06; F02F 7/00

[52] U.S. Cl. ............................ 74/606 R; 123/195 C; 123/192.2

[58] Field of Search .................. 74/606 R; 123/192 B, 123/192 C, 198 P, 192 R, 195 R, 195 C, 195 AC, 90.6

[56] References Cited

U.S. PATENT DOCUMENTS

| | | | |
|---|---|---|---|
| 4,457,187 | 7/1984 | Tsuboi | 123/195 C X |
| 4,573,366 | 3/1986 | Kennard | 74/606 R X |
| 4,606,310 | 8/1986 | Makino | 74/606 R X |
| 4,666,015 | 5/1987 | Matsuda et al. | 74/606 R X |
| 4,960,081 | 10/1990 | Atsuumi | 123/195 C X |
| 5,007,307 | 4/1991 | Tamazawa et al. | 123/192 B |
| 5,014,812 | 5/1991 | Kazama | 123/195 C X |

FOREIGN PATENT DOCUMENTS

| | | | |
|---|---|---|---|
| 3903419 | 9/1989 | Fed. Rep. of Germany | 123/192 B |
| 0243415 | 10/1988 | Japan | 123/90.6 |

*Primary Examiner*—Vinh T. Luong
*Attorney, Agent, or Firm*—Ernest A. Beutler

[57] ABSTRACT

A plurality of engine transmission assemblies for powering vehicles wherein the engine is provided with an integral crankcase transmission assembly that is made up of first, second and third pieces that are connected to each other. The first and second pieces meet along a plane in which the axis of rotation of the engine crankshaft lies. The third piece is affixed to the first and second pieces along a plane that is perpendicular to the first plane and which contains the axis of rotation of the transmission primary shaft and either the transmission secondary shaft or the transmission shift shaft. The constructions have high rigidity and also ease of servicing.

11 Claims, 4 Drawing Sheets

ENGINE, TRANSMISSION ASSEMBLY FOR VEHICLE

BACKGROUND OF THE INVENTION

This invention relates to an engine, transmission assembly for a vehicle and more particularly to an improved, simplified casting construction for such an assembly.

It is well known in motorcycle and other small vehicles to employ a power unit for driving the vehicle that consists of a combined internal combustion engine and change speed transmission. Conventionally, the change speed transmission is mounted within the crank case of the engine and serves to provide the source of mode of power for the wheels. Although a wide variety of arrangements have been proposed for this purpose, the provision of not only a crankcase and crankshaft support but also the support for the primary and secondary shafts of the transmission and the associated shifting mechanism gives rise to considerable assembly problems. Although it is desirable to maintain a relatively small number of pieces, the lesser the number of pieces the more difficult the assembly will be. Also, it is essential to ensure that the rotational axes of the shafts are well supported and well located so as to avoid problems. With prior art construction, it has not always been possible to meet these objectives.

It is, therefore, a principal object of this invention to provide an improved and simplified, combined engine transmission assembly for powering a vehicle and one which simplifies servicing, is rigid and strong.

It is a further object of this invention to provide an engine transmission assembly that is made up of a relatively small number of pieces and yet which affords ease of assembly of the components and ensures accurate location of all shaft rotational axis.

It is a further object of this invention to provide an improved and simplified casting assembly for an engine transmission assembly for powering a vehicle embodying only three pieces and in which all of the shafts or a majority of the shafts are supported at parting lines between the pieces.

SUMMARY OF THE INVENTION

A first feature of this invention is adapted to be embodied in a combined engine transmission assembly for powering a vehicle or the like that comprises a first piece that defines a portion of a crankcase chamber and which is associated with a cylinder bore. A second piece is fixed relative to the first piece along a first plane and defines at least another portion of the crankcase chamber. A crankshaft is journalled for rotation about an axis lying in the first plane. A third piece if fixed relative to the first and second pieces along a second plane and forms therewith a transmission chamber. A primary transmission shaft and a secondary transmission shaft are journalled for rotation about respective axis that lie in the second plane. The primary transmission shaft is driven from the engine crankshaft and the secondary transmission shaft is driven from the primary transmission shaft through any of a selected pair of change speed gears. The secondary transmission shaft is adapted to provide a propulsion source for the associated vehicle.

Another feature of the invention is also adapted to be embodied in a combined engine transmission assembly for powering a vehicle that includes a first piece that defines a portion of a crankcase chamber and is associated with at least one cylinder bore. A second piece is fixed relative to the first piece along a first plane and defines at least another portion of the crankcase chamber. A crankshaft is journalled for rotation about a axis that lies within the first plane. A third piece is affixed to the first and second pieces along a second plane and forms therewith a transmission chamber. A transmission comprised of a primary transmission shaft, a secondary transmission shaft and a shift control shaft are positioned within the transmission chamber with at least two of these shafts being journalled about axis that lie within the second plane.

DETAILED DESCRIPTION OF THE PREFERRED EMBODIMENTS OF THE INVENTION

Figure 1:
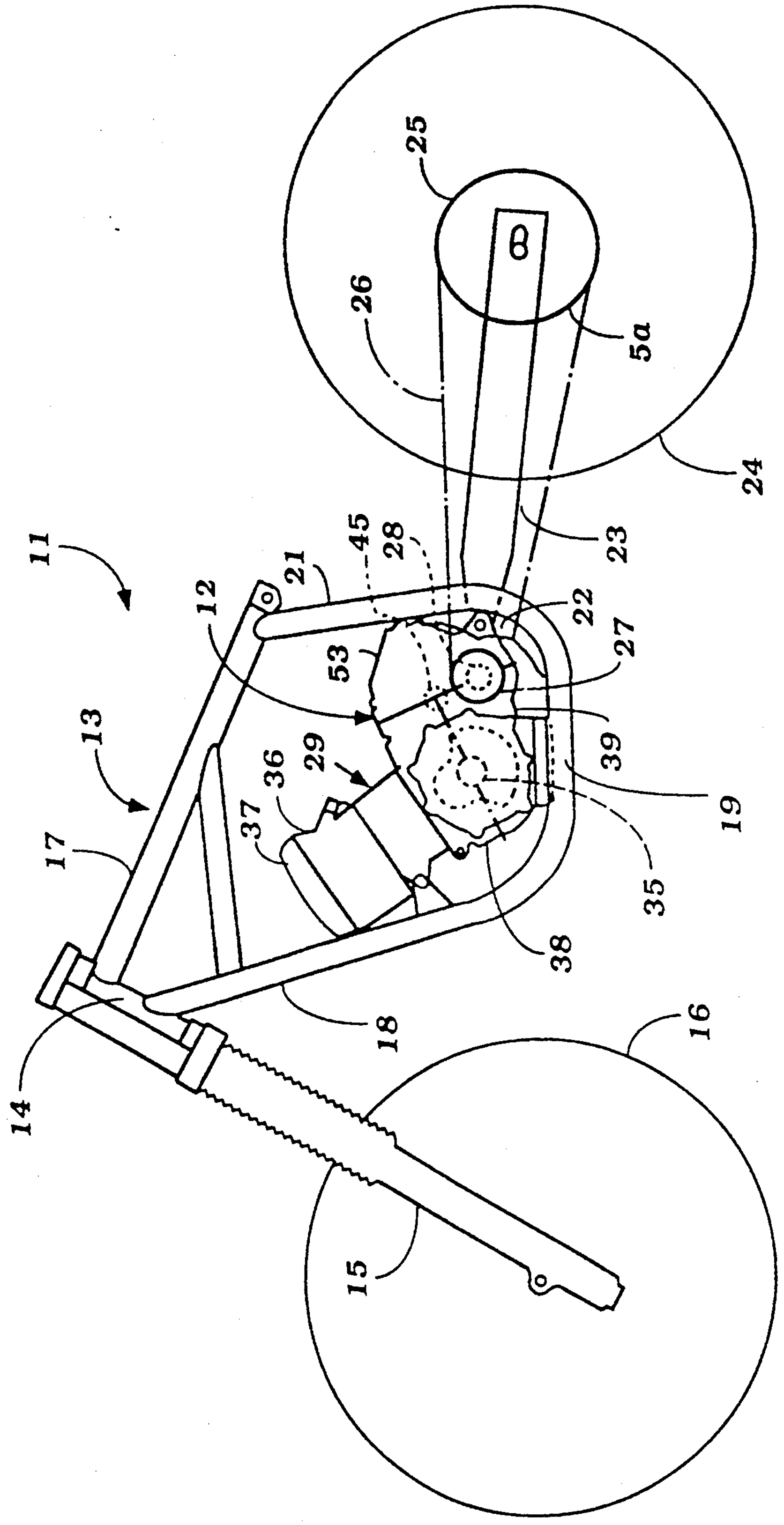
FIG. 1 is a partial side elevational view of portions of a motorcycle powered by a combined engine, transmission assembly constructed in accordance with an embodiment of the invention.

Referring first to FIG. 1, a motorcycle is shown partially and is identified generally by the reference numeral 11. A motorcycle is depicted as such vehicles are typical of those powered by power units of the type to which the invention relates. This power unit is indicated generally by the reference numeral 12. It is to be understood, however, that the invention can be utilized in conjunction with other types of motor vehicles or, for that matter, with other applications embodying internal combustion engines and integral chain speed transmissions.

The motorcycle 11 includes a welded up tubular frame assembly, indicated generally by the reference numeral 13 and in which the power unit 12 is suspended. The frame assembly 13 includes a head pipe 14 which journals a front fork assembly 15 and front wheel 16 for dirigible movement in a known manner. A main pipe 17 extends rearwardly from the head pipe 14 and is supported by means of a down tube 18 have a downwardly extending portion, a horizontally extending portion 19 and an upwardly extending stay portion 21. A bracket assembly 22 is affixed to the frame assembly where the frame portions 19 and 21 join and pivotally supports a trailing arm 23 that rotatably journals a driven rear wheel 24. The rear wheel 24 is provided with a sprocket 25 driven from a sprocket 27 fixed to an output shaft 28 of the power unit 12.

Figure 2:
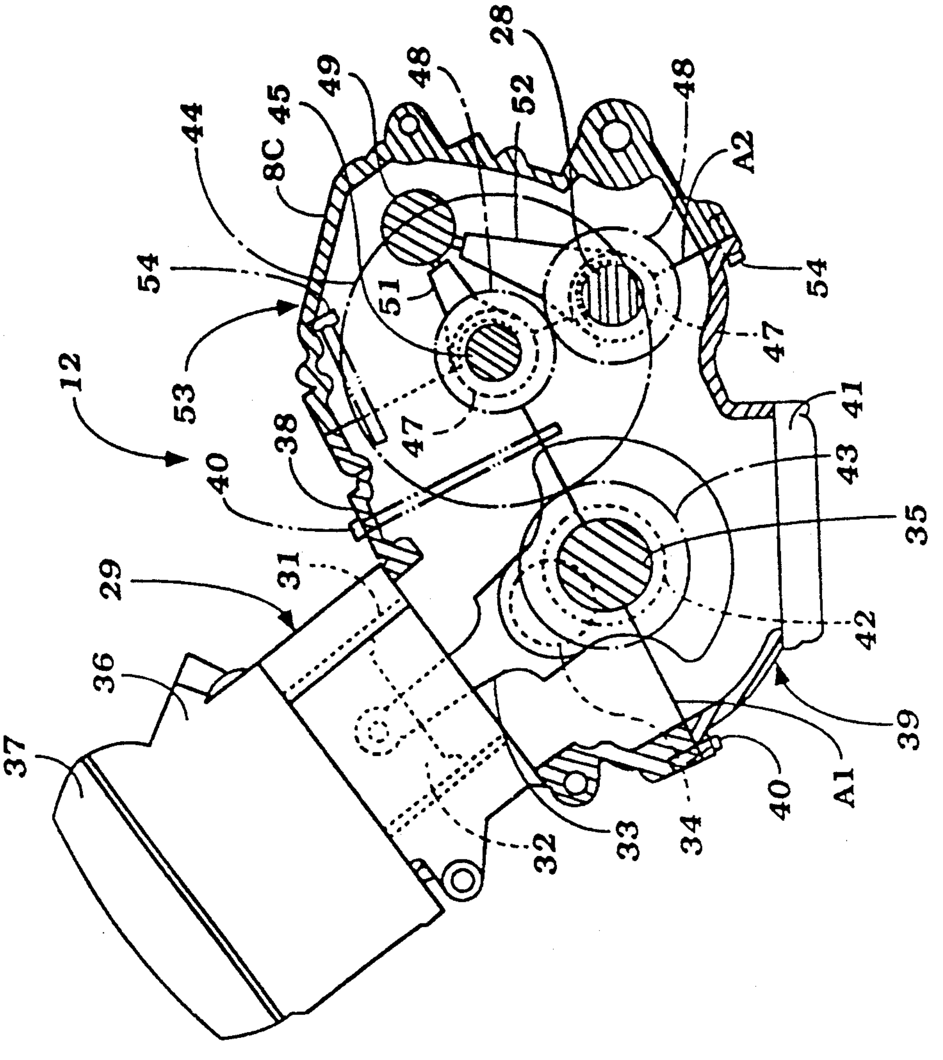
FIG. 2 is an enlarged side elevational view of the engine, transmission assembly, with portions broken away and shown in section.

Referring now in detail to FIG. 2 primarily, the power unit 12 includes an internal combustion engine that includes a cylinder block. The cylinder block 29 is provided with one or more generally vertically extending cylinder bores formed by pressed in liners 31. In a preferred embodiment of the invention, the engine is of the two cylinder in-line type and accordingly there are a pair of such cylinder liners 31.

Pistons 32 reciprocate within the cylinder liners 31 and are connected by means of connecting rods 33 to the individual throws 34 of a crankshaft, indicated generally by the reference numeral 35 and supported in a manner to be described.

A cylinder head 36 is affixed to the cylinder block piece 29 in a suitable manner and forms the combustion chambers, intake ports and exhaust ports. Since any convention construction may be employed, these components have not been illustrated. This mechanism may include an overhead valve arrangement that is driven by one or more camshafts which are closed by a cam cover 37.

Basically the construction of the engine and its mode of operation is not a critical feature of the invention. As already noted, the invention deals with the way that castings or pieces of the propulsion 12 are formed and connected to each other.

As has already been noted, a first piece 38 which may be a light alloy casing forms a portion of a crankcase chamber in which the crankshaft 35 is rotatably journalled. The cylinder block 29 is affixed suitably to this first piece. If desired, a portion of the cylinder line 31 may extend into this first piece 38. A second piece, indicated generally by the reference numeral 39 and which may be also formed from a casting of a lightweight material such as aluminum or an aluminum alloy forms the remainder of the crankcase chamber. The second piece 39 is fixed to the first piece 38 along a parting line indicated at A1 by means of threaded fasteners 40. If desired, a separately removable crankcase pan 41 may be affixed to the lower end of the piece 39 or merely a drain plug can be formed in this piece.

It should be noted that the rotational axis of the crankshaft 35 lies in the plane A1 so that the crankshaft can be easily assembled into the engine before the pieces 38 and 39 are affixed to each other. The crankshaft 35 has bearing portions 42 that may be directly journalled on bearing surfaces formed in the pieces 38 and 39. Alternatively, separate bearing caps may be employed that are affixed to and cooperate with integral bearing surfaces formed in the piece 38 rather than being formed in the piece 39.

A gear 43 is either fixed to the crankshaft 35 or formed integrally with it and drives a gear 44 that forms a portion of a change speed transmission that is comprised of a primary or main shaft 45 and the secondary or drive shaft 28. The shafts 45 and 28 have a plurality of pairs of intermeshing gears thereon indicated at 47 and 48 and dog clutching sleeves selectively engage these gears for rotation with the shafts 45 and 28 so as to change the speed ratio between the primary shaft 45 and the secondary shaft 28, is as well known in this art.

A shift shaft 49 is supported for rotation about an axis parallel to the axis of the shafts 45 and 28 and operates a plurality of shifting forks 51 and 52 for changing the speed ratio between the shafts 45 and 28 as is well known in this art.

The transmission thus far described is supported within a transmission cavity formed in part by the pieces 38 and 39 and completed by a third piece 53 which may also be a casting made from a lightweight material. The third piece 53 is affixed to the first and second pieces 38 and 39 by means of a plurality of threaded fasteners 54 and 55 along a parting line indicated by the plane A2. In this embodiment, the shafts 45 and 28 have their axis of rotation lined in the plane A2. Also, the plane A2 is perpendicular to the plane A1 and the primary shaft 45 and shift shaft 49 lie in the plane A1. Said another way, the main shaft axis 45 lies in the intersection of the planes A1 and A2. It should be readily apparent that this construction provides a relatively simple assembly which can be conveniently assembled and disassembled and which uses nevertheless, a minimum number of parts and which is quite rigid.

Figure 3:
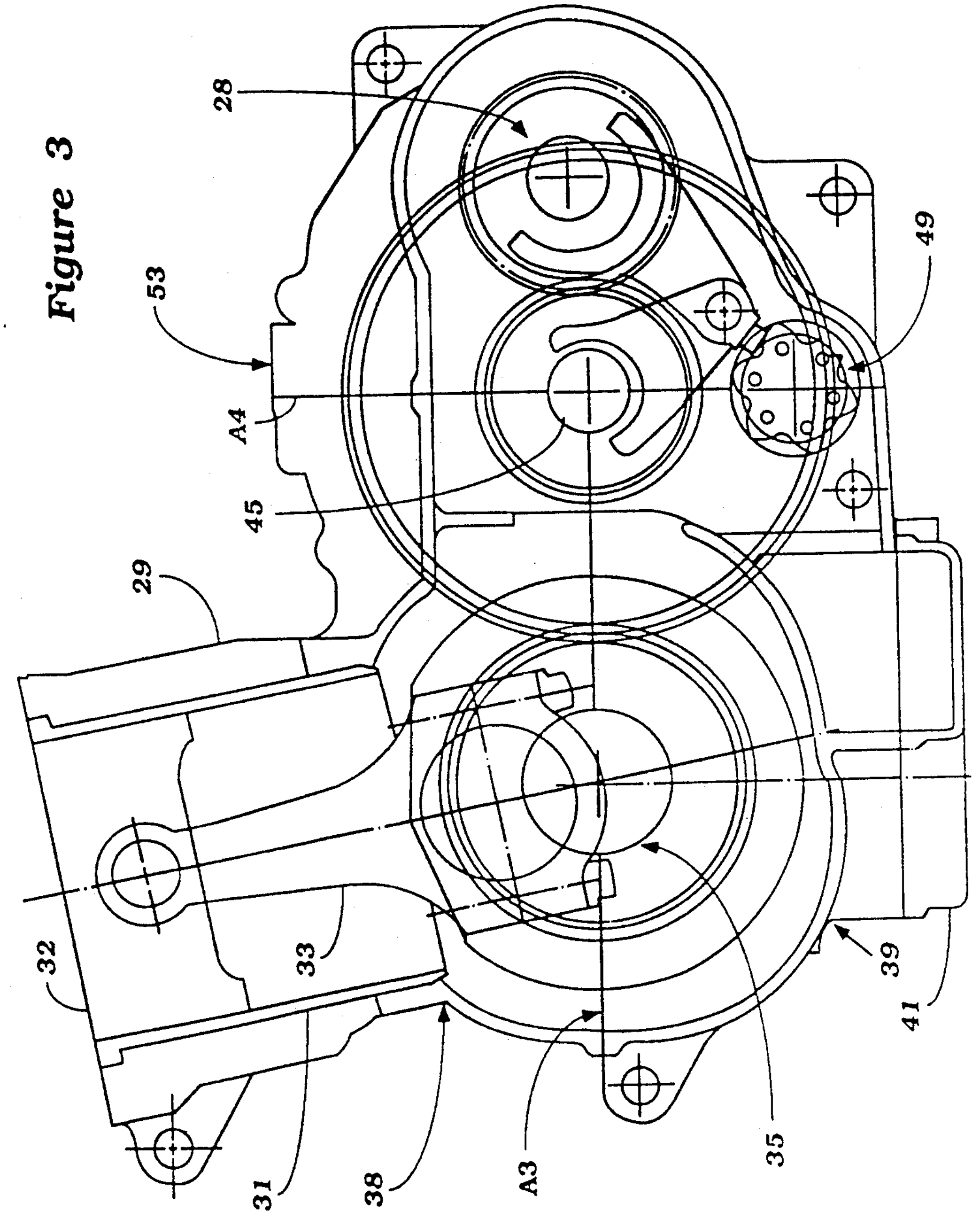
FIG. 3 is a side elevational view, in-part-similar to FIG. 2, and shows another embodiment of the invention.

FIG. 3 illustrates another embodiment of the invention which is basically the same as the previously described embodiment. For that reason, components of this embodiment which are the same as those of the previously described embodiment in function, in not in construction, have been identified by the same reference numeral. The difference between this embodiment and the other embodiment is the relationship of the engine mating planes between the pieces 38, 39 and 53 and the location of the shafts of the transmission relative to these planes. Because of the other similarities of the construction, other details of the construction are not believed to be necessary to enable those skilled in the art to understand this embodiment.

In this embodiment, the plane between the pieces 38 and 39 extends generally horizontally and is indicated by the line A3. The axis of rotation of the crankshaft 35 lies on this plane. In this embodiment, the transmission primary shaft 45 also lies on the mating plane between the pieces 38 and 39 (A3) but also on a line A4 that defines the mating faces between the pieces 38 and 39 and the third piece 53. However, in this embodiment, the secondary or drive shaft 28 lies within the piece 53 and the axis of rotation of the shift shaft 49 lies on the plane A4. Like the embodiment of FIG. 1, the planes A3 and A4 are perpendicular to each other but in this embodiment, as already noted, the plane A3 extends horizontally whereas the plane A1 of the previous embodiment was at an angle to the horizontal. This embodiment is also easily serviced, but quite rigid.

Figure 4:
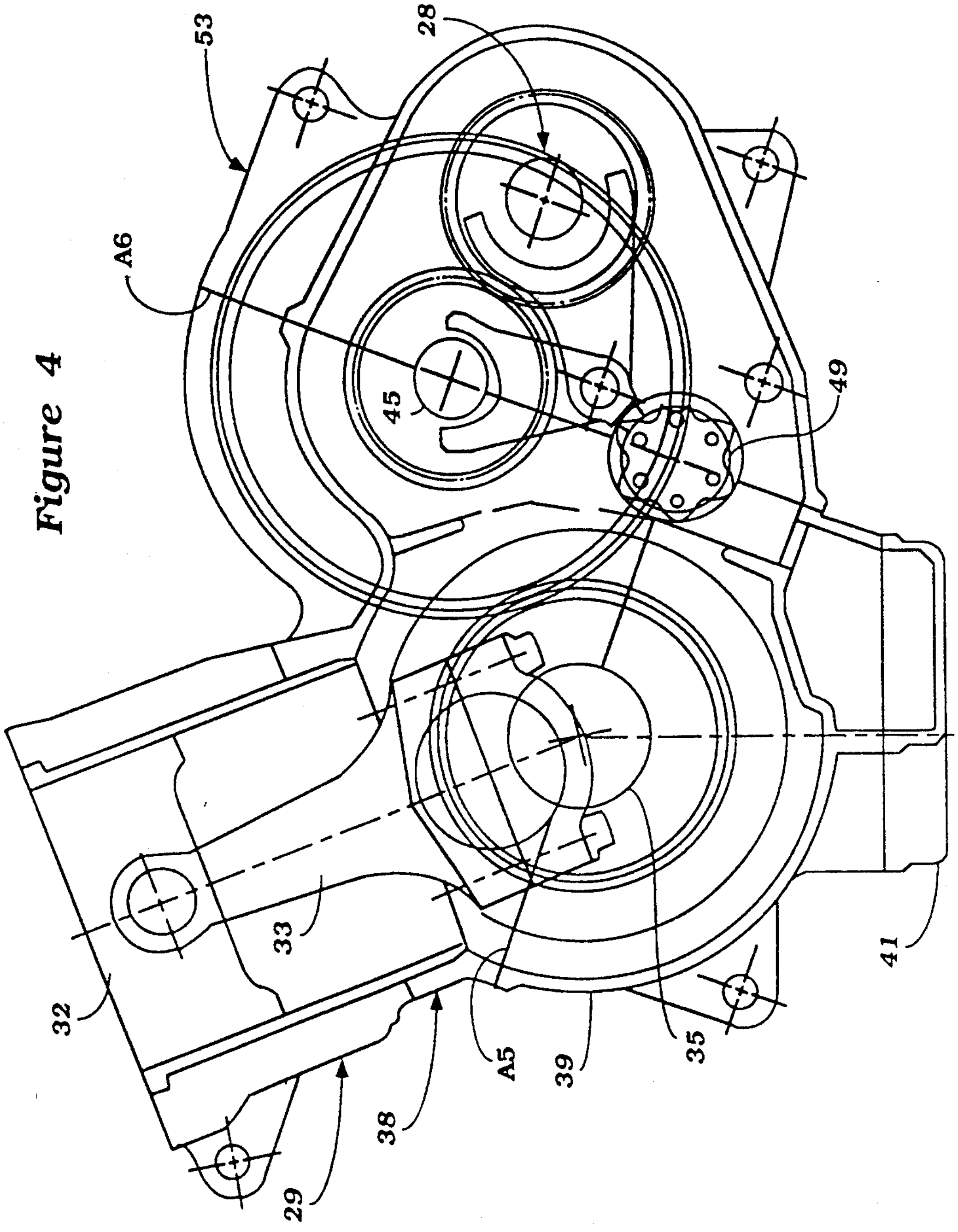
FIG. 4 is a partial side elevational view, in-part-similar to FIGS. 2 and 3, and shows a third embodiment of the invention.

FIG. 4 shows another embodiment of the invention which, like the embodiment of FIG. 3, differs from the embodiment of FIG. 1 only in the relationship of the shaft axes to the various mating planes and the orientation of the mating planes. For that reason, other details of this embodiment may be considered to be the same as those embodiments already described.

In this embodiment, the mating planes between the pieces 38 and 39 is indicated by the line A5 and is inclined downwardly from the horizontal rather than upwardly as in the embodiment of FIGS. 1 and 2 or horizontally as in the embodiment of FIG. 3. The axis of rotation of the crankshaft 35 still lies on this plane. In this embodiment, however, the shift shaft 49 has its axis of rotation laying on this plane and also on a plane A6, which is perpendicular to the plane A5, and which is formed by the mating faces between the piece 53 and the pieces 38 and 39. The primary transmission shaft 45 also lies on this plane where the drive shaft 28 rotates about an axis formed within the piece 53 like the embodiment of FIG. 3. This embodiment also has the ease of servicing and rigidity of the other embodiments.

It should be readily apparent that a number of embodiments of the invention have been illustrated and described. A wide variety of changes and modifications may be made from even those embodiments described without departing from the spirit and scope of the invention, as defined by the appended claims.

I claim:

1. A combined engine transmission assembly for a vehicle comprising a first piece defining a portion of a crankcase chamber and adapted to be associated with a cylinder bore, a second piece fixed relative to said first piece along a first plane and defining at least another portion of said crankcase chamber, a crankshaft journalled for rotation about an axis lying in said first plane, a third piece fixed to said first and said second pieces along a second plane and forming therewith a transmission chamber, a primary transmission shaft and a secondary transmission shaft journalled for rotation about respective axis within said transmission chamber and one of which lies in said second plane, means for driving said transmission primary shaft from said crank shaft, a plurality of change speed gears on said primary transmission shaft and on said secondary transmission shaft for driving said secondary shaft at selected speed ratios from said primary transmission shaft, shifting means for selectively varying the transmission ratio between said primary transmission shaft and said secondary transmission shaft, and means for driving the vehicle from said transmission secondary shaft.

2. A combined transmission engine assembly as set forth in claim 1 wherein the first and second planes are perpendicular to each other.

3. A combined transmission engine assembly as set forth in claim 1 wherein the one transmission shaft comprises the primary transmission shaft and it also lies within the first plane.

4. A combined transmission engine assembly as set forth in claim 3 wherein the first and second planes are perpendicular to each other.

5. A combined transmission engine assembly as set forth in claim 4 wherein the first plane extends horizontally.

6. A combined transmission engine assembly as set forth in claim 1 wherein the first plane is inclined to the horizontal.

7. A combined engine transmission assembly for powering a vehicle comprising a first piece defining a portion of a crankcase chamber and adapted to be associated with a cylinder bore, a second piece fixed relative to said first piece along a first plane and defining at least another portion of said crankcase chamber, a crankshaft journalled for rotation about an axis lying within said first plane, a change speed transmission comprising a primary shaft driven by said crankshaft, a secondary shaft, a plurality of change speed gears on said primary shaft and on said secondary shaft for driving said secondary shaft at selected speed ratios from said primary transmission shaft and a shift shaft journalled for rotation about an axis for selectively engaging said change speed gears to drive said secondary shaft at a selected speed ratio from said primary shaft, a third piece fixed relative to said first and said second pieces along a second plane and forming therewith a transmission chamber in which said change speed transmission is at least partially contained, at least two of said transmission shafts being journalled for rotation in said second plane.

8. A combined engine transmission assembly as set forth in claim 7 wherein the primary transmission shaft and the shift shaft have their axes lying on the second plane.

9. A combined engine transmission assembly as set forth in claim 8 wherein the first and second planes are perpendicular to each other.

10. A combined engine transmission assembly as set forth in claim 9 wherein the primary transmission shaft axis of rotation also lies on the first plane.

11. A combined engine transmission assembly as set forth in claim 9 wherein the transmission shift shaft has its axis of rotation lying on the first plane.

* * * * *